(12) United States Patent
Kelsen et al.

(10) Patent No.: US 9,172,998 B2
(45) Date of Patent: *Oct. 27, 2015

(54) EXCLUDING SPECIFIC APPLICATION TRAFFIC FROM CUSTOMER CONSUMPTION DATA

(71) Applicant: Time Warner Cable Enterprises LLC, New York, NY (US)

(72) Inventors: Michael S. Kelsen, Centreville, VA (US); Tushar Nakhre, Herndon, VA (US); Shan Huang, Ashburn, VA (US); Andrew Danforth, Chantilly, VA (US); Howard Pfeffer, Reston, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,103

(22) Filed: Apr. 24, 2014

(65) Prior Publication Data

US 2014/0237502 A1  Aug. 21, 2014

Related U.S. Application Data

(63) Continuation of application No. 13/342,727, filed on Jan. 3, 2012, now Pat. No. 8,793,714.

(51) Int. Cl.
| | |
|---|---|
| *H04N 21/2543* | (2011.01) |
| *H04N 21/426* | (2011.01) |
| *H04N 21/462* | (2011.01) |
| *H04N 21/258* | (2011.01) |
| *H04N 21/61* | (2011.01) |

(Continued)

(52) U.S. Cl.
CPC ........ *H04N 21/4622* (2013.01); *H04L 12/1435* (2013.01); *H04L 12/1485* (2013.01); *H04M 15/41* (2013.01); *H04M 15/60* (2013.01); *H04M 15/8214* (2013.01); *H04N 21/2541* (2013.01); *H04N 21/2543* (2013.01); *H04N 21/25841* (2013.01); *H04N 21/262* (2013.01); *H04N 21/266* (2013.01); *H04N 21/42684* (2013.01); *H04N 21/6118* (2013.01); *H04N 21/6168* (2013.01); *H04N 21/6175* (2013.01); *H04N 21/6402* (2013.01); *H04N 21/64322* (2013.01)

(58) Field of Classification Search
CPC .......... H04N 21/6118; H04N 21/4622; H04N 21/42684; H04N 21/6125; H04N 21/438; H04N 21/4532; H04N 21/6377; H04N 21/2543

See application file for complete search history.

(56) References Cited

U.S. PATENT DOCUMENTS

2003/0105763 A1* 6/2003 Chatfield et al. ................ 707/10
2005/0027887 A1* 2/2005 Zimler et al. .................. 709/249

(Continued)

*Primary Examiner* — Hai V Tran
(74) *Attorney, Agent, or Firm* — Chapin IP Law, LLC

(57) ABSTRACT

Techniques disclosed herein include systems and methods for excluding specific application traffic from customer consumption-based data billing counts. This is useful for excluding traffic from consumption totals where the application traffic has been accounted for using other means, such as through billing as a separate or technically distinct service. In practice, a tablet computer (or other end user device) can run a video application that uses a high-speed data network via a cable modem. This video application may be included as part of a core video package associated with a distinct cable television service. The system then provides accurate consumption billing of customer traffic that is outside of any other managed services by creating separate logical data service flows at a Cable Modem Termination System (CMTS) for excluding specific traffic counts.

15 Claims, 6 Drawing Sheets

(51) Int. Cl.
*H04N 21/6402* (2011.01)
*H04N 21/643* (2011.01)
*H04L 12/14* (2006.01)
*H04M 15/00* (2006.01)
*H04N 21/254* (2011.01)
*H04N 21/262* (2011.01)
*H04N 21/266* (2011.01)

(56) References Cited

U.S. PATENT DOCUMENTS

2008/0155613 A1\* 6/2008 Benya et al. .................... 725/89
2011/0126244 A1\* 5/2011 Hasek ............................. 725/87

\* cited by examiner

EXCLUDING SPECIFIC APPLICATION TRAFFIC FROM CUSTOMER CONSUMPTION DATA

RELATED APPLICATIONS

This application is a continuation of earlier filed U.S. patent application Ser. No. 13/342,727 entitled "EXCLUDING SPECIFIC APPLICATION TRAFFIC FROM CUSTOMER CONSUMPTION DATA," filed on Jan. 3, 2014, the entire teachings of which are incorporated herein by this reference.

BACKGROUND

The present disclosure relates to content delivery systems and billing systems for such content delivery systems including cable and Internet data communications services.

A significant portion of Internet service plans provide Internet connectivity through a cable modem. Such Internet connectivity is often provided by a cable TV service provider. It is common for such cable-based Internet service to be provided along with conventional cable television service. For example, a single coaxial cable simultaneously delivers signals for conventional cable TV service as well as Internet data to a customer location (such as a residential house). At the customer premises, the cable line is typically split so that the conventional cable television service is transmitted to one or more set top boxes connected to one or more televisions, while the Internet data follows a separate line to a cable modem. The cable modem can then provide Internet connectivity (wireless or physical connectivity) to multiple devices such as desktop computer, Voice-over-IP telephones, laptop computers, cellular telephones, tablet computers, etc.

A significant portion of television service content (usually delivered by cable, satellite, or broadcast) is moving more and more towards Internet Protocol (IP) or IP-based delivery mechanisms. There are various third-party services that provide movies, TV shows, and other multimedia content via IP-based delivery. Cable television service providers that also provide Internet connectivity (e.g. via cable modem) can also now provide a portion of television programming (including live TV) through consumer operated computer applications (e.g. a software program provided by the cable operator that is downloaded and executes on that consumers home PC or mobile device). These consumer software applications receive television programming via IP-based transfer instead of conventional television signaling. By way of a specific example, a desktop computer or tablet computer can have an application installed that enables a user to select and view television broadcasts supplied from the cable TV service provider, including real-time or live television service, that is streamed over the Internet and received in IP packets through that consumer's cable modem, as opposed to being transmitted to a set top box and decoded into conventional television signals (e.g. HDMI signals). In other words, in addition to delivering cable TV service to set top boxes, the cable service provider can also stream cable television service over the Internet connection using IP packets.

SUMMARY

The IP-based delivery of cable television service to a user's home or mobile device essentially provides a second or third (i.e., additional) TV for a given cable television customer. Such a television interface can be convenient such as when used with very portable wireless tablet computers as the television screen can easily move throughout the customer premises. With certain types of Internet service agreements, such IP-based cable television service can create billing problems since the IP packets that arrive into the consumer's cable modem are treated, for billing purposes, just like any other kind of data.

It is common for Internet service plans to vary a level of service and corresponding price based on download/upload speeds in that pricing can reflect a given download speed range offered by the Internet service provider. For example, a given ISP can charge a first monthly rate to have an Internet connection of 15 Megabytes per second download speed, and then have a second monthly rate for providing a Internet connection with download speeds up to 50 Megabytes per second. With such data rate billing plans or packages, there is usually unlimited data transfer—subject to the speed limitations. Thus, such Internet service plans are speed-based.

Other types of Internet service plans can have consumption-based pricing instead of, or in addition to, speed-based limitations. That is, other types of Internet service plans can base a periodic fee on a particular amount of data that can be downloaded/consumed within a given period of time. This is also known as a consumption-based billing (CBB) model. For example, Internet service plans commonly have a monthly billing cycle. While some plans allow for unlimited data transfer (subject to data transfer or bandwidth rates), other plans can be limited to a particular amount of data that can be transferred per billing period, with unlimited speed or subject to a particular transfer speed limitation. For example, such plans can affix a price for data downloads up to 20 Gigabytes (GB) per month, 50 GB per month, 500 GB per month, or any other offered amount. If a user exceeds this amount of data transfer in the given time period, they are billed additional amounts for overages. These additional amounts can become expensive.

Embodiments disclosed herein are based in part on the observation that it is undesirable to have cable television content (e.g. TV shoes, movies, on-demand programming, etc.) provided by the cable service provider (that could be watched on any conventional television via set top box reception at that consumers home) and viewed via an IP-based interface (e.g. streamed to the user's computer or mobile device through the cable modem), to count against any type of data bandwidth consumption cap or limitation. That is, since the consumer could watch television using his or her set top box and a conventional television, why should the user's be penalized by making a choice to watch that same programming or content on his or her computer (the penalty being that the content is now being received as data packets that are counted against his or her monthly data limit or bandwidth limit).

Techniques disclosed herein include systems and methods for excluding specific application traffic from customer consumption-based billing data counts. Such exclusion can be executed in real time. In one example configuration, the system can group all devices or servers (i.e. content distribution network (CDN) servers) that provide the IP-TV service (or any managed service that provides content) into a well-defined block of IP addresses (e.g. CDN addresses). The system then creates or establishes classifiers on a Cable Modem Termination System (CMTS). The CMTS is a head-end device that communicates and provides data and signaling to individual consumer cable modems. The classifiers enable the CMTS to identify different types of IP data flows or streams within all the data packets being transmitted to (or from) a given cable modem. That is, the classifiers enable the CMTS to identify specific IP-packet traffic coming from that block of IP addresses (traffic transmitted downstream towards a customer cable modem) or going to that block of IP addresses (traffic transmitted upstream towards specific IP addresses). In response, the CMTS classifies that traffic into a separate data service flow or traffic flow that is then excluded (for billing purposes) from other data transfer that is counted towards a consumers data bandwidth or monthly transfer limit that is applied to that consumer's account. In other words, the system distinguishes some Internet traffic that is carrying CDN content that originates from certain known IP addresses from default Internet traffic (e.g. general web traffic, email, data, etc.). The exclusion of CDN traffic such as IP-based streaming television is done in these embodiments since the customer is already paying for the ability to watch this traffic with a coupled cable television service agreement. The system then essentially treats a tablet computer displaying cable television content as if the tablet computer were just another TV device in the customer's house. This billing exclusion can apply for any "managed service," meaning a service for which the customer already purchases.

One embodiment includes a content manager that executes a data consumption tracking and billing process or system for managing billing of consumption-based data billing plans. The content manager receives, at a Cable Modem Termination System (CMTS) or other device that feeds data to a customer device such as modem (e.g. customer cable modem or modem that works on media networks that are not "cable" networks, such as optical networks, or hybrid coax/optical networks), Internet Protocol (IP) data packets having a destination address of the customer cable modem. The CMTS is configured to forward the IP data packets to the customer cable modem via a first logical data service flow identifier, that is, a default setting is to send IP packets via the first logical data service flow. The customer cable modem corresponds to a customer service account having both cable television service and cable Internet service. The content manager examines packet headers of the IP data packets received at the CMTS. In response to identifying a stream of data packets having a source IP address that matches an IP address from a predetermined set of IP addresses, the CMTS forwards that stream of data packets to the cable modem via a second logical data service flow identifier instead of via the first logical data service flow identifier. This predetermined set of IP addresses corresponding to devices that serve cable television content that is excluded from a consumption-based data billing plan of the cable Internet service, such as cable television programming already purchased as part of cable television service. The content manager also transmits an IP Detail Record (IPDR) towards a billing system that processes the customer service account. The IPDR indicates a first data consumption count of data forwarded via the first logical data service flow identifier.

Accordingly, cable television and other managed services that are accounted for separately or using other means can be delivered across IP networks to customer devices without being counted towards data usage on consumption-based Internet service agreements.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving, at a Cable Modem Termination System (CMTS), Internet Protocol (IP) data packets having a destination address of a customer cable modem, the CMTS being configured to forward the IP data packets to the customer cable modem via a first logical data service flow identifier, the customer cable modem corresponding to a customer service account having both cable television service and cable Internet service; examining packet headers of the IP data packets received at the CMTS; in response to identifying a stream of data packets having a source IP address that matches an IP address from a predetermined set of IP addresses, forwarding the stream of data packets to the cable modem via a second logical data service flow identifier instead of via the first logical data service flow identifier, the predetermined set of IP addresses corresponding to devices that serve cable television content that is excluded from a consumption-based data billing plan of the cable Internet service; and transmitting an IP Detail Record (IPDR) towards a billing system that processes the customer service account, the IPDR indicating a first data consumption count of data forwarded via the first logical data service flow identifier. The billing system can utilize a naming convention for each service flow to identify which flow or flows are to be counted or not towards the customers consumption limit. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Time Warner Cable Inc., New York, N.Y.

As discussed above, techniques herein are well suited for use in software applications supporting billing for IP data service. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
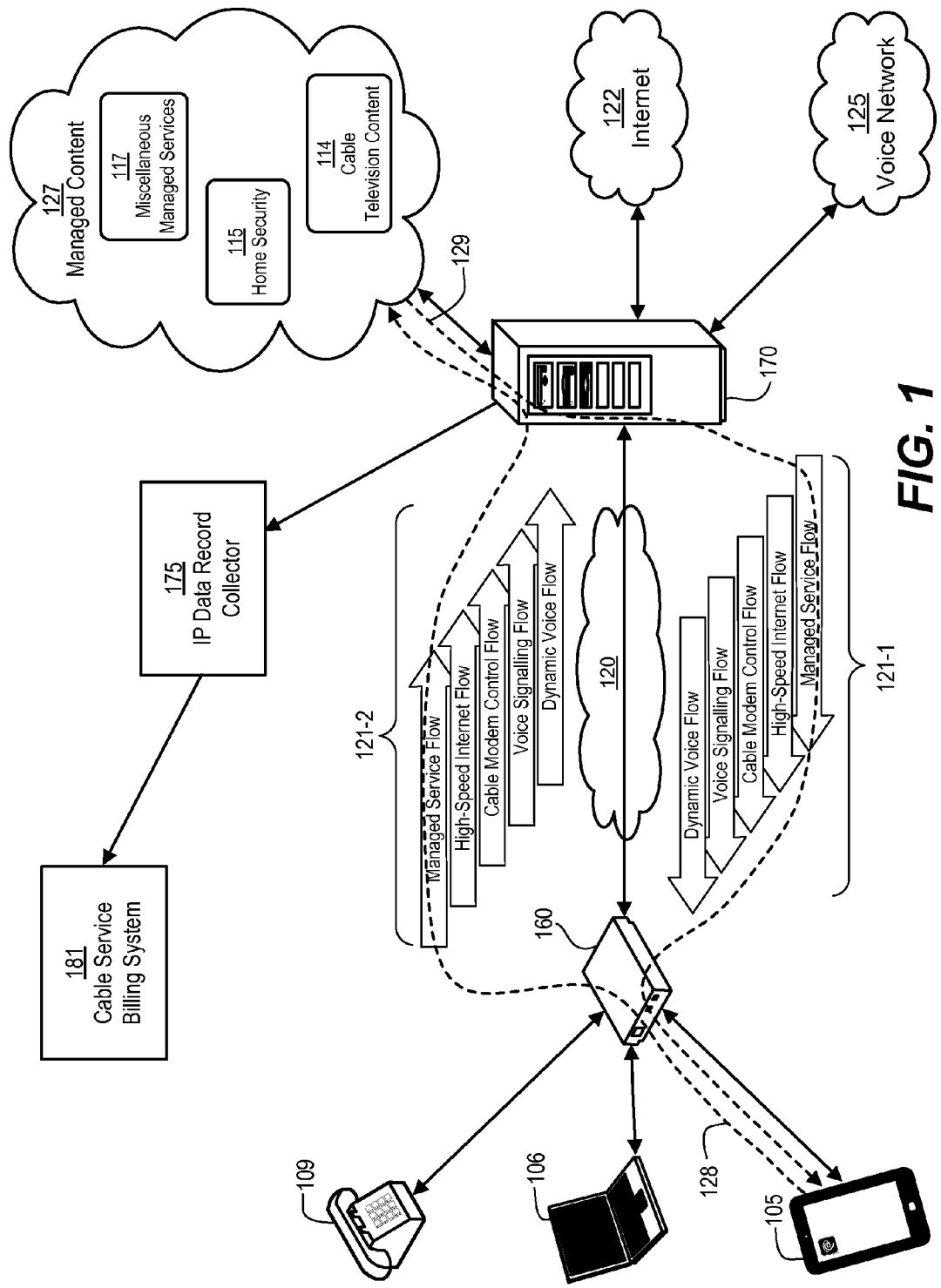
FIG. 1 is a block diagram of a service flows within a cable Internet system according to embodiments herein.

Techniques disclosed herein include systems, methods and apparatus for excluding specific application traffic from being counted as data against a predetermine limit for customer consumption-based billing data counts. This is useful for excluding traffic from consumption totals where the application traffic has been accounted for or is available to the consumer using other means, such as through billing as a separate or distinct service, though both services can appear on a single bill. For example a tablet computer can run a video software application that uses a high-speed data network (via a cable modem). This video application may be included as part of a core video package associated with a distinct cable television service provider. As such, it may not be desirable to bill a customer for traffic consumed and rendered to the user by this video software application when such content is accounted for separately. That is, the user could simply watch that same content on his or her television without the television content using up or being counted towards bandwidth or data usage limits on his or her cable modem traffic plan. Accordingly, the system provides accurate consumption billing of customer traffic that is outside of any other managed services.

In general, the system segments and is able to identify customer traffic into managed and unmanaged flows, and then instructs back office consumption management tools to ignore data flow counts from the managed flows for customer billing purposes. As an example, the system can group all desired services (managed services such as CDN data streaming from a CDN server) into a common or central IP address block for corresponding application servers. A new Data Over Cable Service Interface Specification (DOCSIS) service flow is defined for a customer modem. The system uses a classifier that matches (i.e. identifies and records an amount of) any traffic to or from this common IP address block. For example, a video application server farm and content delivery network can all be assigned IP addresses from this common IP address block (within a specified range of addresses). By using this address block as a classifier to match on traffic either to or from this space, the system can direct or move this application specific traffic into a separate DOCSIS service flow. With desired traffic segmented into a separate flow, the system can instruct the back-office systems, such as IP Detail Record (IPDR) collectors or billing systems, to ignore consumption from this flow when calculating a customer's overall bandwidth consumption.

The usage record (IPDR in this example) can identify each logical service data flow using a unique naming convention. For example for data packets that are to be counted towards customer data consumption, a logical data service flow can be named HSD_RES_250. This example name can be used to track data usage for all packets that are to be counted towards the total consumption for a high speed residential data service having a maximum consumption of 250 GB per month for a given customer. When the customer cable modem initially boots up and is configured, the cable modem can provide a list of the logical data service flows to the CMTS. Each logical data service flow can have a predetermined name that is recognizable by a billing system that determines customer data usage. As the customer requests data traffic such as data, video, or other media that is transmitted to the customer premises via the cable modem (i.e. via IP data packets), the CMTS can identify which logical data service flow that data traffic is associated with and can keep a count of the amount of data of each different logical data service flow type. Periodically (e.g. every 15 minutes), the CMTS can transmit the usage record (e.g. IPDR in this example) to a billing system. The billing system can quickly determine, using the unique naming conventions that have been predefined for each logical data service flow, which logical data service flow (or flows) to exclude or include when calculating customer data consumption. As an example, the billing system can count any data packets sent on the logical data service flow HSD_RES_250 (e.g. all customer data other than data used to transport on demand television shows watched on that users computer) against the total consumption limit for this customer while all other logical data service flows can be ignored. In this manner, the usage record includes naming conventions to respectively identify each logical data service flow. The billing system utilizes the naming conventions of respective logical data service flows to determine which data service flow to be counted or not towards data usage corresponding to the customer device.

This technique can be extended to include other managed services to customers including but not limited to home security, video/content on demand, WIFI roaming and third party applications/sites. Further details regarding DOCSIS service flows and classifiers can be found in U.S. patent application Ser. No. 13/074,634, filed on Mar. 29, 2011, and entitled "A System and Method for Assigning a Service Flow Classifier," which is hereby incorporated by reference in its entirety.

Now more specifically and referring to FIG. 1, a block diagram illustrates cable modem service flows for managed services traffic. Cable Modem Termination System (CMTS) 170 is a conventional device typically located at a headend or hubsite of a cable provider. CMTSs are configured to provide high-speed data services, such as cable Internet or voice over Internet Protocol, to cable customers. A given CMTS typically provides data services to multiple customer cable modems, such as cable modem 160 or an Advanced Wireless Gateway (AWG). CMTS 170 is connected to customer cable modem 160 via a hybrid fiber coax (HFC) 120 connection, which provides a high capacity data link.

Customer cable modem 160 is typically located at a customer's premises, such as at a user's condo within a building, a home, an office building, etc. This diagram shows the customer cable modem 160 connected to a telephone 109, a laptop computer 106, and a tablet computer 105. Note that these are just exemplary customer devices that can be connected to the customer cable modem 160. Also note that the connection to the customer cable modem 160 can be wired or wireless (e.g. via an 802.11 based wireless communications protocol), and that the wireless router or other customer gateway device can sit between the end user devices and the customer cable modem 160. The telephone device 109 is IP-based voice delivery service as opposed to conventional circuit switched telephone systems.

CMTS 170 is shown as connected to various resources. CMTS 170 connects to voice network 125, which can include server computers to route and manage telephone calls, and interface with various types of cellular and landline telephone systems. CMTS 170 connects to the Internet 122 for essentially any content available online, such as news, websites, email, multimedia, and so forth. Content from network 122 is typically not provided by or managed by a provider of the CMTS 170, such as a cable television company. The provider of the CMTS 170, however, provides or manages content 127. Such managed content can include cable television content 114, a home security service 115 (including video from surveillance cameras), and miscellaneous managed services 117.

The CMTS 170 can establish service flows 121-1 and 121-2 between the CMTS 170 and the customer cable modem 160. Each service flow is a logical flow. The system can create multiple data service flows. For example, as shown, there are separate service flows for dynamic voice data (Voice-over-IP), for voice signaling, for cable modem control messaging, for high-speed Internet data, as well as for managed services (shown within the arrow outlines). By creating separate logical service flows, the CMTS 170 can separately count data sent or received on a given data service flow. The CMTS 170 logs this data activity and generates an IP Detail Record (IPDR). This detail record identifies a particular customer by MAC or IP address, contains a timestamp indicating the interval for this record, and reports the amount of bytes consumed on the network. The CMTS 170 collects IPDR information for each service flow that a customer is using. There can be specific service flows defined for voice signaling and for call bearer traffic as well as content preview services. Traffic that is not classified within a specific service flow can be counted in a default service flow, such as the high-speed Internet flow. It is this default service flow traffic that can ultimately be billed to the customer as part of a data-consumption plan. The CMTS 170 can be configured to transfer IPDRs to an IP data collector 175 or other central collector, which can then be aggregated and transmitted to a cable service billing system 181.

A service flow can include a uni-directional flow of packets that provides a certain quality of service (QoS). In addition to QoS, the billing system/IPDR collector can be instructed to count or not count bytes of a particular service flow for billing purposes. A classifier can include using a pattern-matching rule that identifies the traffic that should use a particular service flow. Classifiers can identify traffic based upon source/destination MAC/IP addresses, source/destination port numbers, Type of Service (ToS) bits (priority), IP Protocol type and other values in the IP packet header. Each classifier can also have a priority associated with it to instruct the CMTS 170 in the proper order to evaluate classifiers for placement into the desired service flow. In some embodiments, multiple classifiers can be configured to all point to a single service flow. A service flow is created when a cable modem comes online (powered on). While the customer cable modem is turned on, it provisions itself and connects to the CMTS.

In some specific embodiments, classifiers and the flows can be defined in a configuration file that the cable modem receives when it boots. A server can generate those configuration files that define all the different IP blocks or IP groups or a list of individual IP address that should be matched and identified as part of the content data network flow or "managed services" flow. After receiving these configuration files, the cable modem then exchanges its registration with the CMTS and provides this to the CMTS as part of the DOCSIS protocol. Note that the configuration file can be transmitted to the cable modem, after which the cable modem exchanges the information in the configuration file with the CMTS as part of a registration process.

By way of a more specific example, consider that the customer cable modem 160 is tied to a customer account that purchases both cable-based Internet service and cable television service. Conventionally this is referred to as "bundling" or grouping services. A VOIP service can also be grouped into the customer account. Such grouping enables the customer to pay for multiple services using a single account or invoice. Consider also that tablet computer 105 contains a cable television viewing application for viewing cable television programming via IP-based delivery through the cable modem 160. Note that this customer would have a separate connection to set top boxes at televisions because the conventional cable television signals do not pass through the customer cable modem 160.

An end user launches a cable television viewing application on tablet computer 105. In response, tablet computer 105 transmits a request for cable television content to access managed content 127. This request follows path 128 via customer cable modem 160 using a Managed Service Flow, through CMTS 170 to access cable television content 114. In response, one or more servers within managed content 127 begin transmitting cable television content (or other managed content) as shown by path 129. When corresponding data packets arrive at the CMTS 170, a classifier examines the data packets and determines that the data packets originate from a particular IP address block. As a response, the classifier directs (or redirects) those data packets to a managed service/content flow identifier, and then to the tablet computer 105 via the customer cable modem 160. By routing such data packets on a separate data service flow, a separate IPDR can be created specifically for this flow.

Figure 6:
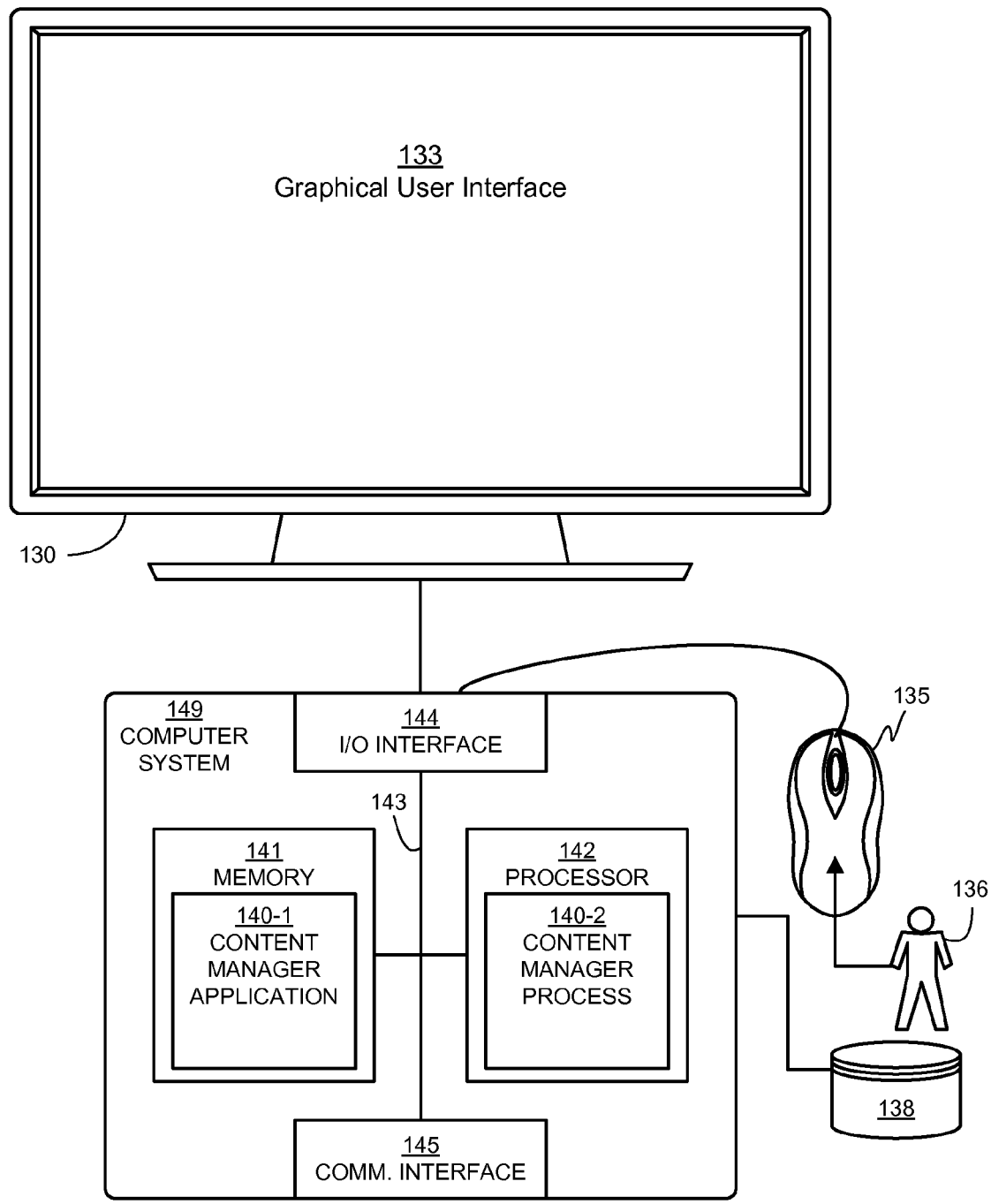
FIG. 6 is an example block diagram of a content manager and/or billing system operating in a computer/network environment according to embodiments herein.

FIG. 6 illustrates an example block diagram of a content manager 140 operating in a generic computer/network environment according to embodiments herein. In summary, FIG. 6 shows computer system 149 displaying a graphical user interface 133 that provides a consumption-based billing system interface. Computer system 149 can connect to a remote server for processing assistance. Computer system hardware aspects of FIG. 6 will be described in more detail following a description of the flow charts.

Functionality associated with content manager 140 will now be discussed via flowcharts and diagrams in FIG. 2 through FIG. 5. For purposes of the following discussion, the content manager 140 or other appropriate entity (such as the CMTS or customer cable modem) performs steps in the flowcharts.

Figure 2:
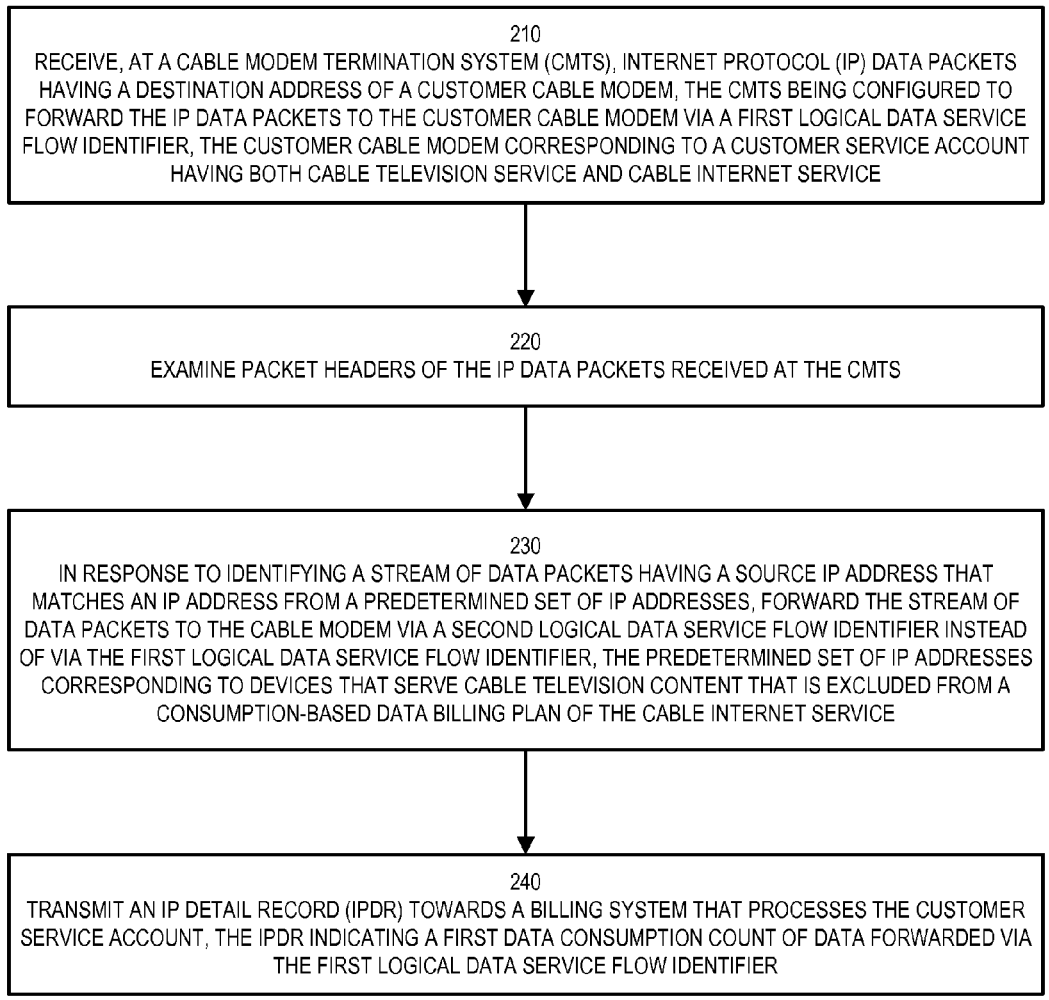
FIG. 2 is a flowchart illustrating an example of a process supporting content management and billing according to embodiments herein.

Now describing embodiments more specifically, FIG. 2 is a flow chart illustrating embodiments disclosed herein. In step 210, content manager 140 receives, at a Cable Modem Termination System (CMTS), Internet Protocol (IP) data packets having a destination address of a customer cable modem. Having a destination address of the customer cable modem means that the destination address either identifies the cable modem itself or that the destination address identifies customer-premises equipment (CPE) that is accessed via the cable modem (with the cable modem being a type of gateway to one or more customer-premises equipment). Note that the cable modem can be directly linked to the CPE, or be directly linked to a router (such as a wireless home router) that in turn provides data connectivity to the CPE.

The CMTS is configured to forward the IP data packets to the customer cable modem via a first logical data service flow identifier, such as a default service flow for Internet traffic. The customer cable modem corresponds to a customer service account having both cable television service and cable Internet service, such a bundled package of services. Note that the destination address of a customer cable modem can include the cable modem, any associated router or AWG, or end user devices within a local network. In other words, having a destination address of the customer cable modem refers to data packets that must be forwarded or routed to or through a particular customer cable modem.

In step 220, the content manager 140 examines packet headers of the IP data packets received at the CMTS. This examination can identify IP or MAC address.

In step 230, in response to identifying a stream of data packets having a source IP address that matches an IP address from a predetermined set of IP addresses (or in response to identifying predetermined information in the packet header), the CMTS forwards the stream of data packets to the cable modem via a second logical data service flow identifier instead of via the first (default) logical data service flow identifier. This predetermined set of IP addresses corresponds to devices that serve cable television content that is excluded from a consumption-based data billing plan of the cable Internet service. Note that the set of IP address can include a block or range of IP addresses, or a list of specific IP address to exclude.

In step 240, the CMTS transmits an IP Detail Record (IPDR) towards a billing system that processes the customer service account. The IPDR indicating a first data consumption count of data forwarded via the first logical data service flow identifier. This can be transmitted towards a billing system by first being transmitted to a collector or intermediate aggregation system before be transmitted to the billing system.

Figure 3:
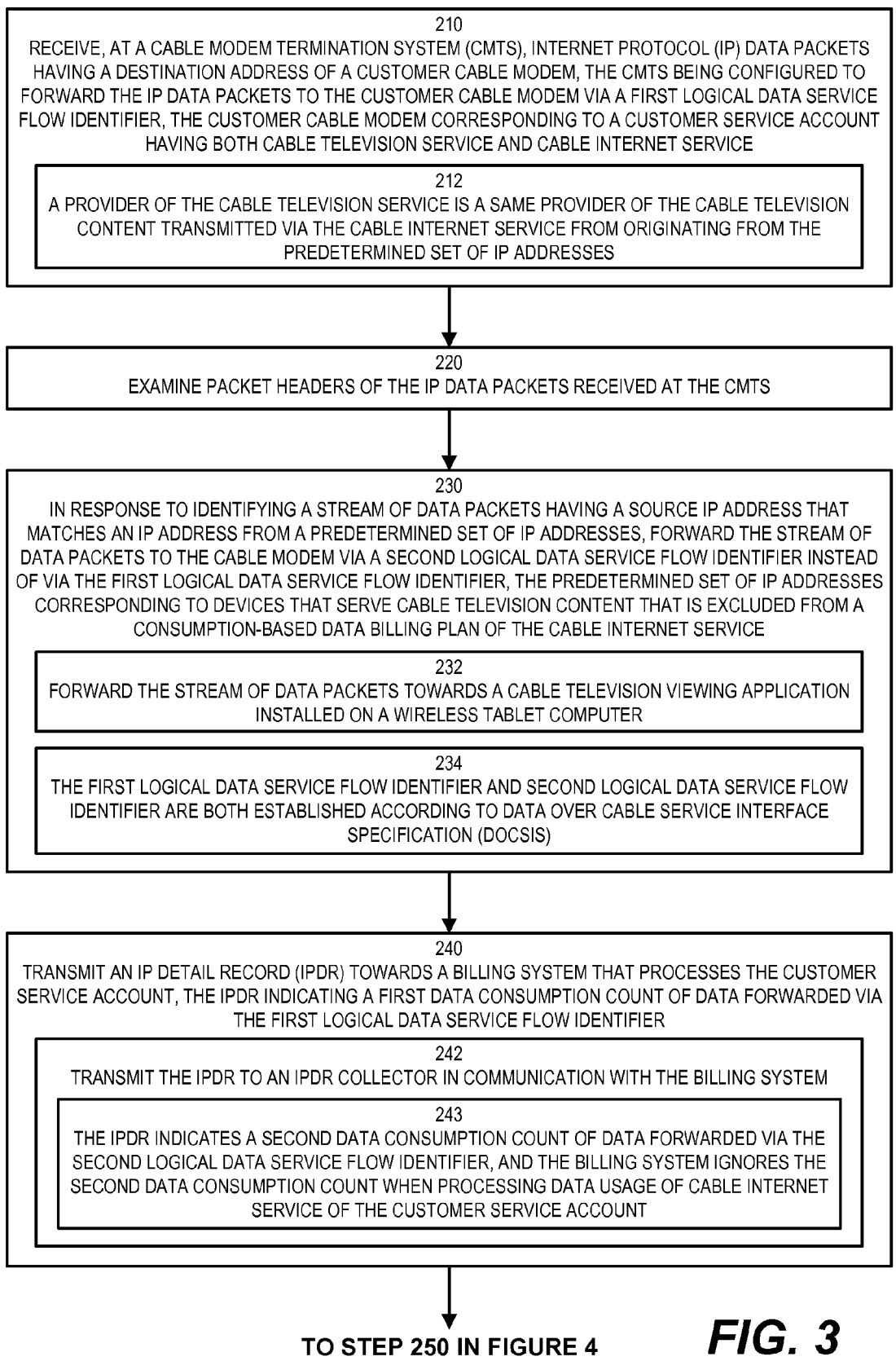
FIGS. 3-4 are a flowchart illustrating an example of a process supporting content management and billing according to embodiments herein.
Figure 4:
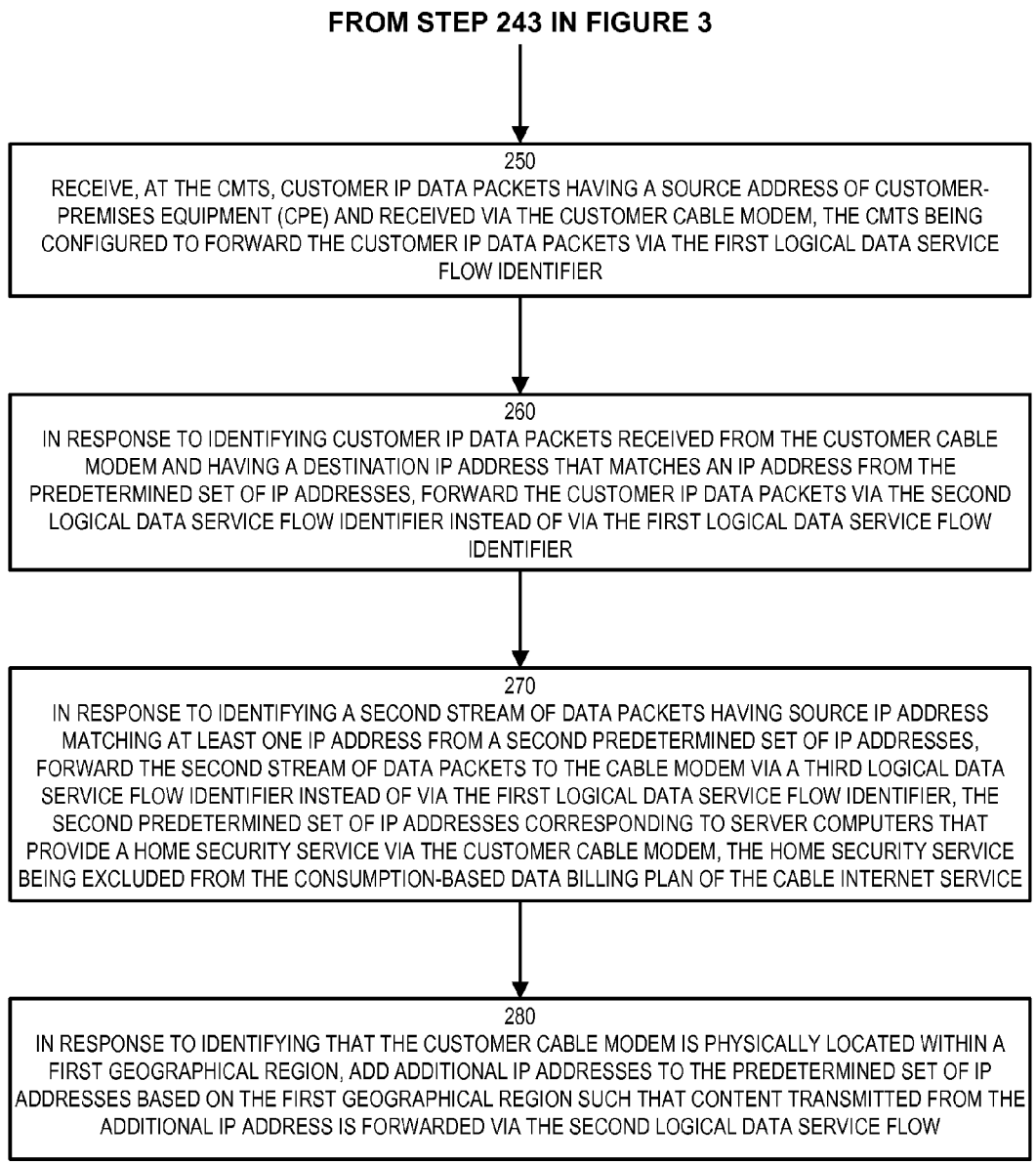

FIGS. 3-4 include a flow chart illustrating additional and/or alternative embodiments and optional functionality of the content manager 140 as disclosed herein.

In step 210, content manager 140 receives, at a Cable Modem Termination System (CMTS), Internet Protocol (IP) data packets having a destination address of a customer cable modem. The CMTS is configured to forward the IP data packets to the customer cable modem via a first logical data service flow identifier, such as a default service flow for Internet traffic. The customer cable modem corresponds to a customer service account having both cable television service and cable Internet service, such a bundled package of services.

In step 212, a provider of the cable television service is a same provider of the cable television content transmitted via the cable Internet service from originating from the predetermined set of IP addresses. In other words, one particular entity provides cable television (or other managed service) in addition to Internet connectivity, such as with a bundled service plan.

In step 220, the content manager 140 examines packet headers of the IP data packets received at the CMTS.

In step 230, in response to identifying a stream of data packets having a source IP address that matches an IP address from a predetermined set of IP addresses, the CMTS forwards the stream of data packets to the cable modem via a second logical data service flow identifier instead of via the first (default) logical data service flow identifier. This predetermined set of IP addresses corresponds to devices that serve cable television content that is excluded from a consumption-based data billing plan of the cable Internet service. By forwarding the stream of data packets to the cable modem via a second logical data service, the CMTS tracks the amount of data packets for that stream and records this information in a usage record. Each logical data service flow can have a unique name and naming conventions can be used within the usage records. Thus, data that is to be counted against a total amount of consumption allowed for that customer can be tracked by the CMTS and the logical data service flow name can be identified by the billing system. The billing system periodically receives the usage record and can use the predefined named of the logical data service flow to quickly determine what service flow or flows to exclude or not from being counted against the customers total data usage.

In step 232, the content manager 140 forwards the stream of data packets towards a cable television viewing application installed on a wireless tablet computer, desktop computer, cell phone, or other end user device.

In step 234, the first logical data service flow identifier and second logical data service flow identifier are both established according to Data Over Cable Service Interface Specification (DOCSIS).

In step 240, the CMTS transmits an IP Detail Record (IPDR) towards a billing system that processes the customer service account. The IPDR indicating a first data consumption count of data forwarded via the first logical data service flow identifier.

In step 242, the content manager transmits the IPDR to an IPDR collector in communication with the billing system. Such an IPDR collector can aggregate multiple IPDRs for an individual customer.

In step 243, the IPDR indicates a second data consumption count of data forwarded via the second logical data service flow identifier, and the billing system ignores the second data consumption count when processing data usage of cable Internet service of the customer service account. Thus, while data counts can be recorded and reported for each or any service flow, only one or more specific data service flows are counted for data-consumption billing purposes.

In step 250 the content manager 140 receives, at the CMTS, customer IP data packets having a source address of Customer-Premises Equipment (CPE) and received via the customer cable modem, the CMTS being configured to forward the customer IP data packets via the first logical data service flow identifier. Thus, the system can count and thereby exclude traffic going in either direction—either from the CMTS to the customer cable modem, or from the customer cable modem to the CMTS.

In step 260, in response to identifying customer IP data packets received from the customer cable modem that have a destination IP address that matches an IP address from the predetermined set of IP addresses, the content manager forwards the customer IP data packets via the second logical data service flow identifier instead of via the first logical data service flow identifier.

In step 270, in response to identifying a second stream of data packets having source IP address matching at least one IP address from a second predetermined set of IP addresses, the content manager forwards the second stream of data packets to the cable modem via a third logical data service flow identifier instead of via the first logical data service flow identifier. For example, a particular customer might also be paying for a VOIP service or some other type of managed service, which may not be desired to be included in any other service flow. Alternatively, this second predetermined set of IP addresses corresponding to server computers that provide a home security service via the customer cable modem, the home security service being excluded from the consumption-based data billing plan of the cable Internet service. Note that VOIP service may be separately accounted for using the VOIP protocol instead of using IP blocks.

In step 280, in response to identifying that the customer cable modem is physically located within a first geographical region, the content manager adds additional IP addresses to the predetermined set of IP addresses based on the first geographical region such that content transmitted from the additional IP address is forwarded via the second logical data service flow. For example, if the system identifies that a customer cable modem is located in New York state, then IP addresses for a set of servers designated for New York state can be added to the set of addresses.

Figure 5:
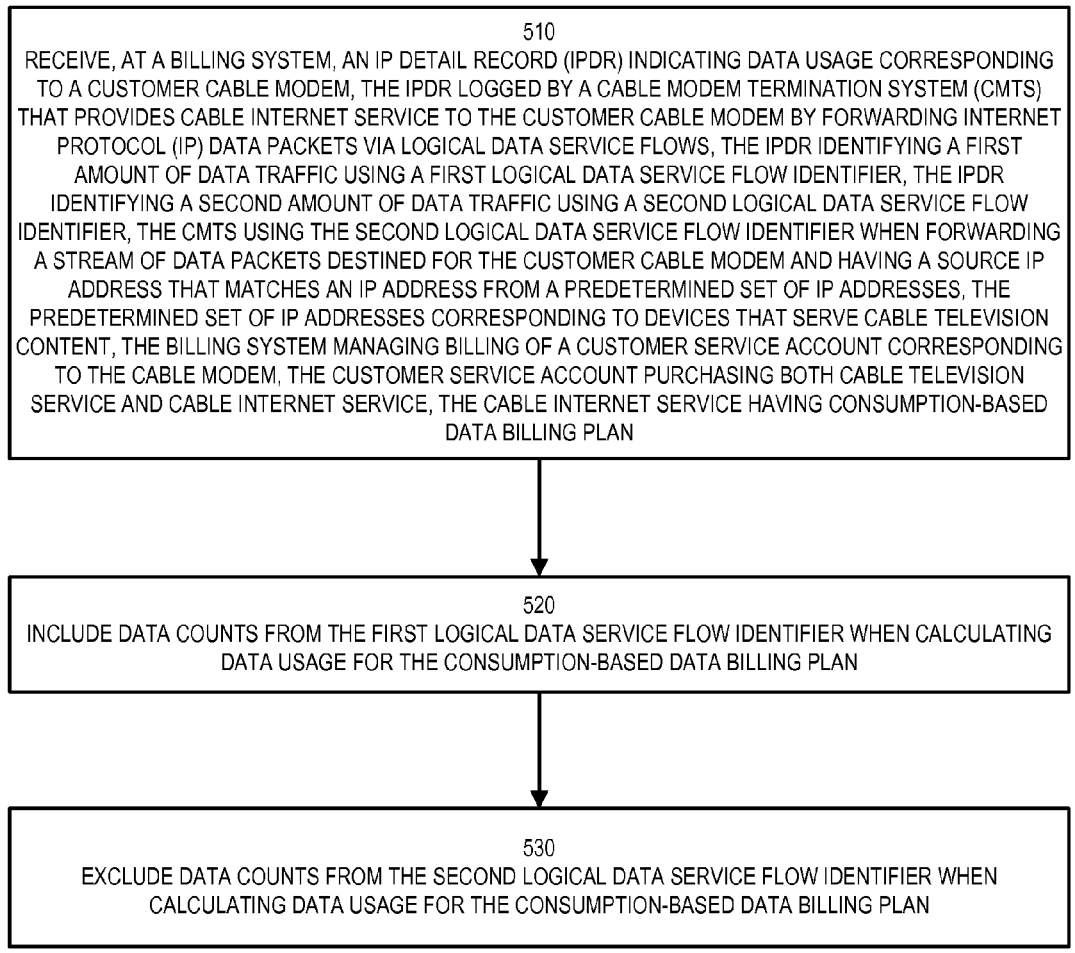
FIG. 5 is a flowchart illustrating an example of a process supporting content management and billing according to embodiments herein.

FIG. 5 includes a flow chart illustrating additional and/or alternative embodiments and optional functionality of the content manager 140 as disclosed herein.

In step 510, a billing system receives an IP Detail Record (IPDR) indicating data usage corresponding to a customer cable modem. This IPDR having been logged by a Cable Modem Termination System (CMTS) that provides cable Internet service to the customer cable modem by forwarding Internet Protocol (IP) data packets via logical data service flows. The IPDR identifies a first amount of data traffic using a first logical data service flow identifier. The IPDR also identifies a second amount of data traffic using a second logical data service flow identifier. The CMTS uses the second logical data service flow identifier when forwarding a stream of data packets destined for the customer cable modem and having a source IP address that matches an IP address from a predetermined set of IP addresses. The predetermined set of IP addresses corresponds to devices that serve cable television content. The billing system managing configured to bill a customer service account corresponding to the cable modem. The customer service account purchasing both cable television service and cable Internet service, with the cable Internet service having consumption-based data billing plan.

In step 520, the system include data counts from the first logical data service flow identifier when calculating data usage for the consumption-based data billing plan.

In step 530, the system excludes data counts from the second logical data service flow identifier when calculating data usage for the consumption-based data billing plan.

The CMTS can thus forwarding the stream of data packets to the cable modem via the second logical data service flow identifier instead of via the first logical data service flow identifier. Also, the CMTS can forward the stream of data packets towards a cable television viewing application installed on a wireless tablet computer. The first logical data service flow identifier and second logical data service flow identifier are both established according to Data Over Cable Service Interface Specification (DOCSIS). Additionally, the CMTS can use a third logical data service flow identifier when forwarding a second stream of data packets destined for the customer cable modem and having a source IP address that matches at least one IP address from a second predetermined set of IP addresses, instead of using the first logical data service flow identifier. The second predetermined set of IP addresses can corresponds to server computers that provide a home security service corresponding to the customer cable modem, with the home security service being excluded from the consumption-based data billing plan of the cable Internet service.

Yet other embodiments can include deep packet inspection (DPI) to distinguish managed service content from general high-speed traffic. Executing deep packet inspection (DPI), however, is intrusive and expensive, and thus not as preferable as techniques previously disclosed herein to identify actual content within data packets. In addition to traffic separation, the system can also incorporate traffic segmentation (such as be using SSIDs) to even further separate traffic counts on the customer end, or to enable such a billing system during roaming on another customer's WIFI network. For example, a first user having bundled service visits a second user having only consumption-based Internet service. If the first user watches cable television content on the second user's home network, then corresponding data counts can be excluded from data usage counted against/towards the second user.

In another embodiment, techniques include a method, system or apparatus for managing billing of consumption-based data billing plans. This includes receiving data packets having a destination address of a customer device. These data packets are received at a content distribution device that delivers content to multiple customer premises. Such a device can be a network server(s), network interface device, CMTS, etc. The customer device can include a personal computer, portable computer, cell phone, cable modem, DSL modem, optical network unit (ONU), router, and so forth. The content distribution device is configured to forward the data packets to the customer device via a first logical data service flow identifier of a plurality of logical data service flow identifiers. The content distribution device examines packet headers of the data packets received at the content distribution device. In response to identifying a stream of data packets having predetermined information in the packet header, the content distribution device forwards the stream of data packets to the customer device via a second logical data service flow identifier instead of the first logical data service flow identifier. The predetermined information identifies packets that are excluded from a consumption-based data billing plan, which can be associated with the customer device. The content distribution device transmits a usage record to a billing system that processes billing for the customer device or an account associated with the customer device. The usage record indicates a data consumption count for at least one of the plurality of logical data service flow identifiers.

Forwarding the stream of data packets to the customer device via the second logical data service flow can include forwarding the stream of data packets towards a television viewing application installed on a portable computing device, such as a tablet computer, smart phone, etc. The content distribution device can deliver both television content and Internet connectivity to the multiple customer premises using hybrid fiber coax (HFC) broadband network, Fiber-to-the-premises fiber optic network, or other similar networks. The content distribution device can be embodied as a Cable Modem Termination System (CMTS), Digital Subscriber Line Access Multiplexer (DSLAM), Optical Network Terminal (ONT), Optical Network Unit (ONU) or Optical Line Terminal (OLT). Note that a provider of television service can be a same provider of television content transmitted via Internet service originating from a predetermined set of IP addresses. In other words, a given Internet Service provider not only provides Internet connectivity, but also serves multimedia content (instead of simply providing connectivity to third party content.

The content distribution device can receive customer data packets having a source address of Customer-Premises Equipment (CPE), and which packets are received via the customer device. The content distribution device can be configured to forward the customer data packets via the first logical data service flow identifier. In response to identifying customer data packets received from the customer device, with those data packets having a destination address that matches an address from a predetermined set of addresses, the content distribution device forwards the customer data packets via the second logical data service flow identifier instead of the first logical data service flow identifier.

Continuing with FIG. 6, the following discussion provides a basic embodiment indicating how to carry out functionality associated with the content manager 140 as discussed above. It should be noted, however, that the actual configuration for carrying out the content manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the content manager 140 of computer system 149 to communicate over a network and, if necessary, retrieve any data required to create views, process content, communicate with a user, etc. according to embodiments herein.

As shown, memory system 141 is encoded with content manager 140-1 that supports functionality as discussed above and as discussed further below. Content manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the content manager 140-1. Execution of the content manager 140-1 produces processing functionality in content manager process 140-2. In other words, the content manager process 140-2 represents one or more portions of the content manager 140 performing within or upon the processor 142 in the computer system 149.

It should be noted that, in addition to the content manager process 140-2 that carries out method operations as discussed herein, other embodiments herein include the content manager 140-1 itself (i.e., the un-executed or non-performing logic instructions and/or data). The content manager 140-1 may be stored on a non-transitory, tangible computer-readable storage medium including computer readable storage media such as floppy disk, hard disk, optical medium, etc. According to other embodiments, the content manager 140-1 can also be stored in a memory type system such as in firmware, read only memory (ROM), or, as in this example, as executable code within the memory system 141.

In addition to these embodiments, it should also be noted that other embodiments herein include the execution of the content manager 140-1 in processor 142 as the content manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A method comprising:
    establishing a content distribution service including a first data service flow and a second data service flow over a shared communication link for distribution of content to a communication device operated by a subscriber, content transmitted over the first data service flow counted toward billable content delivery in accordance with a data delivery agreement with the subscriber, content transmitted over the second data service flow excluded from the billable content delivery;
    utilizing the first data service flow to forward first requested content to the communication device;
    receiving second requested content as a stream of data packets from a second content distribution resource;
    redirecting the second requested content over the second data service flow, instead of transmitting over the first data service flow, to the communication device in response to detecting that an alternate version of the second requested content is available from a first content distribution resource but that the second requested content is received from the second content distribution resource;
    wherein detecting that the second requested content is sourced from the second content distribution resource includes: processing the stream of data packets to obtain network address information from the stream of data packets, the network address information indicating that the second content distribution resource is a respective source from which the stream of data packets is transmitted to the communication device;

wherein the first data service flow and the second data service flow extend between a cable modem termination system receiving the stream of data packets and a respective cable modem disposed in a subscriber premises in which the subscriber resides, the subscriber receiving the second requested content at the communication device through the cable modem; and wherein the alternate version of the second requested content is available to the subscriber over the shared communication link from the first content distribution resource on a communication path other than through the cable modem.

2. The method as in claim 1, wherein the first content distribution resource makes the alternate version of the second requested content available to the subscriber over the shared communication link in accordance with a cable network service agreement; and wherein the second content distribution resource makes the second requested content available to the subscriber over the shared communication link in accordance with an Internet service agreement.

3. The method as in claim 2, wherein a content service provider provides, to the subscriber, a bundled package including the cable network service agreement and the Internet service agreement; and wherein the content service provider provides the version of the second requested content for distribution from the first content distribution resource and the second requested content from the second content distribution resource.

4. The method as in claim 1, wherein the second requested content and the alternate second requested content are video data respectively available from the second content distribution resource and the first content distribution resource; and wherein the second requested content includes a source identifier indicating that the second content distribution resource sourced the second requested content.

5. The method as in claim 1, wherein the second requested content is transmitted over the second data service flow instead of the first data service flow as a result of identifying that the subscriber pays for an ability to retrieve the second requested content from the first content distribution resource.

6. The method as in claim 1, wherein the first content distribution resource provides the subscriber access to the alternate version of the second requested content over the communication path in accordance with a cable network service agreement; and wherein the second content distribution resource provides the subscriber access to the second requested content in accordance with an Internet service agreement on the path other than through the cable modem.

7. The method as in claim 1, wherein the first data service flow is a default service flow over which IP (Internet Protocol) data is transmitted to the subscriber.

8. The method as in claim 1 further comprising:

generating first content consumption information indicating an amount of data transmitted over the first data service flow;

generating second content consumption information indicating an amount of data transmitted over the second data service flow; and forwarding the first content consumption information and the second content consumption information to a billing system.

9. A method comprising:

from a first content distribution resource of a content distribution service, receiving a stream of data requested by a subscriber operating a communication device;

analyzing the received stream of data; and in response to detecting that the stream of data represents content that is alternatively available to the subscriber as part of a cable service agreement from a second content distribution resource, excluding the transmission of the stream of data from a data delivery consumption count associated with an Internet-based data retrieval service agreement, the data delivery consumption count representing an amount of data transmitted over a corresponding shared communication link to the communication device;

wherein excluding the transmission of the stream of data from the data consumption count includes: forwarding the stream of data over a second data service flow instead of a first data service flow supporting delivery of Internet-based data, content transmitted over the first data service flow being counted toward billable content delivery in accordance with the Internet-based data retrieval service agreement, the stream of data transmitted over the second data service flow excluded from the billable content delivery; and wherein the first data service flow and the second data service flow extend between a cable modem termination system receiving the stream of data packets and a respective cable modem disposed in a subscriber premises in which the subscriber resides, the subscriber receiving the second requested content at the communication device through the cable modem; and wherein the second requested content is available to the subscriber over the shared communication link from the first content distribution resource on a communication path other than through the cable modem.

10. The method as in claim 9, wherein forwarding the stream of data includes:

analyzing a source address indicating a respective source from which the stream of data is transmitted; and detecting that the source address is assigned to a server resource that transmits a version of the content available over the communication path.

11. A computer system comprising:

computer processor hardware; and a storage resource coupled to the computer processor hardware, the storage resource storing instructions that, when executed by the computer processor hardware, cause the computer processor hardware to perform the operations of:

establishing a content distribution service including a first data service flow and a second data service flow over a shared communication link for distribution of content to a communication device operated by a subscriber, content transmitted over the first data service flow counted toward billable content delivery in accordance with a data delivery agreement with the subscriber, content transmitted over the second data service flow excluded from the billable content delivery;

utilizing the first data service flow to forward first requested content to the communication device; and receiving second requested content as a stream of data packets from a second content distribution resource;

utilizing the second data service flow, instead of the first data service flow, to forward the second requested content to the communication device in response to detecting that second requested content is sourced from a second content distribution resource, the second requested content available to the subscriber also available from a first content distribution resource;

wherein detecting that the second requested content is sourced from the second content distribution resource includes: processing the stream of data packets to obtain network address information from the stream of data packets, the network address information indicating that the second content distribution resource is a respective source from which the stream of data packets is transmitted to the communication device;

wherein the first data service flow and the second data service flow extend between a cable modem termination system receiving the stream of data packets and a respective cable modem disposed in a subscriber premises in which the subscriber resides, the subscriber receiving the second requested content at the communication device through the cable modem; and wherein the second requested content is available to the subscriber over the shared communication link from the first content distribution resource on a communication path other than through the cable modem.

12. The computer system as in claim 11, wherein the first content distribution resource makes the second requested content available to the subscriber in accordance with a cable network service agreement; and wherein the second content distribution resource makes the second requested content available to the subscriber through the cable modem termination system and cable modem in accordance with an Internet service agreement.

13. The computer system as in claim 12, wherein a content service provider provides, to the subscriber, a bundled package including the cable network service agreement and the Internet service agreement; and wherein the content service provider provides availability of the second requested content for distribution from the first content distribution resource and the second content distribution resource.

14. The computer system as in claim 11, wherein the second requested content is transmitted over the second data service flow instead of the first data service flow as a result of the subscriber paying for an ability to receive the second requested content from the first content distribution resource.

15. The computer system as in claim 14, wherein the first content distribution resource provides the subscriber access to the second requested content to the subscriber in accordance with a cable network service agreement; and wherein the second content distribution resource provides the subscriber access to the second requested content in accordance with an Internet service agreement.

\* \* \* \* \*